United States Patent [19]

Maddock

[11] Patent Number: 5,056,437
[45] Date of Patent: Oct. 15, 1991

[54] DEVICE FOR INITIALIZING AN AUTOMATED WAREHOUSING SYSTEM

[75] Inventor: John C. Maddock, Canton, Ohio

[73] Assignee: Republic Storage Systems Company, Inc., Canton, Ohio

[21] Appl. No.: 524,216

[22] Filed: May 15, 1990

[51] Int. Cl.⁵ .............................................. G05D 1/00
[52] U.S. Cl. ............................. 104/88; 364/424.02; 180/169; 414/274
[58] Field of Search ...................... 104/88; 364/424.01, 364/424.02, 444, 447, 456, 449; 414/273, 274, 275; 180/167, 168, 169; 340/686; 356/152, 141

[56] References Cited

U.S. PATENT DOCUMENTS

| | | |
|---|---|---|
| 3,119,501 | 1/1964 | Lemelson . |
| 3,389,814 | 6/1968 | Lemelson . |
| 3,486,640 | 12/1969 | Lemelson . |
| 3,557,977 | 1/1971 | Atwater ............................... 414/274 |
| 3,734,311 | 5/1973 | Thompson et al. .................. 414/273 |
| 3,815,084 | 6/1974 | Pease ................................... 414/274 |
| 3,824,020 | 7/1974 | Pease ................................... 414/274 |
| 3,863,772 | 2/1975 | Schwartz . |
| 3,971,483 | 7/1976 | Weber . |
| 4,019,606 | 4/1977 | Caputo et al. . |
| 4,027,823 | 6/1977 | Kawarai et al. . |
| 4,089,269 | 5/1978 | Shaw .................................... 104/88 |
| 4,122,957 | 10/1978 | Allen et al. . |
| 4,189,273 | 2/1980 | Sodestrom et al. ................. 414/285 |
| 4,212,375 | 7/1980 | Peterson et al. . |
| 4,311,212 | 6/1982 | Simpson . |
| 4,369,563 | 1/1983 | Williamson . |
| 4,411,577 | 10/1983 | Shearer ................................ 340/686 |
| 4,415,975 | 11/1983 | Burt ..................................... 364/444 |
| 4,428,708 | 1/1984 | Burt . |
| 4,547,844 | 10/1985 | Adams . |
| 4,614,474 | 9/1986 | Sudo . |
| 4,621,410 | 11/1986 | Williamson . |
| 4,634,332 | 1/1987 | Kamide et al. . |
| 4,651,863 | 3/1987 | Reuter et al. . |
| 4,668,154 | 5/1987 | Ueno et al. . |
| 4,678,329 | 7/1987 | Lukowski et al. .................. 356/152 |
| 4,684,247 | 8/1987 | Hammill ............................. 356/152 |
| 4,690,280 | 9/1987 | Meyer . |
| 4,714,399 | 12/1987 | Olson . |
| 4,750,592 | 6/1988 | Watt . |
| 4,918,607 | 4/1990 | Wibble ................................ 364/443 |
| 4,947,094 | 8/1990 | Dyer et al. .......................... 180/169 |

OTHER PUBLICATIONS

Republic Storage Products and Systems, AS/RS, pp. 29–30, Company brochure 8/1985.

*Primary Examiner*—Robert J. Oberleitner
*Assistant Examiner*—Mark T. Le
*Attorney, Agent, or Firm*—Calfee, Halter & Griswold

[57] ABSTRACT

A new and useful device for initializing an automated warehouse system when the system is in its "power-up" mode. The device of the invention initializes the system at "power-up" by sensing the midpoint of a specially formed gap between two strips of retroreflective tape, and establishing the midpoint of that gap as the floating, zero offset, reference point for the system.

8 Claims, 6 Drawing Sheets

DEVICE FOR INITIALIZING AN AUTOMATED WAREHOUSING SYSTEM

TECHNICAL FIELD

The present invention relates to an automated warehousing system, and particularly to a device for initializing the warehousing system when power to the system is turned on. The device of the present invention is specifically designed to initialize the system and to create a reference point against which future operations of the system are controlled.

BACKGROUND

Automated warehousing systems have been known in the art for many years. Typically, an automated warehousing system comprises a carriage which delivers bins to, or retrieves bins, from one or more storage racks. Each storage rack has an array of horizontally and vertically oriented bin locations (stations). Each bin location is designed to support a bin filled with materials. Each bin location has a different numerical designation, representing the horizontal and vertical coordinates of the bin location in the storage rack.

A computer controls movement of the carriage relative to the storage rack, and the bin locations thereon. The computer causes the carriage, and a load-handling device supported on the carriage, to move to a selected bin location and to either deliver a bin to the selected bin location or retrieve a bin from the selected bin location. A bin retrieved from a selected bin location is delivered either to a pick-up and delivery station or to another bin location. Moreover, a bin can be retrieved from the pick-up and delivery station and delivered to a selected bin location.

When the system is initially turned on, it is in what is referred to in the art as a "power-up" mode and must find an initial point of reference. When the system is in a "power-up" mode, the carriage may be in any particular location, depending upon the last task the carriage was directed to perform before power to the system was discontinued. At "power-up", it is important that the system establish a floating, zero offset, reference point from which subsequent movement of the carriage can be controlled. One known way of establishing such a floating, zero offset, reference point is by means of a reed type proximity switch sensor and a magnet pair. The magnet is gapped from the reed at a distance which exceeds the maximum limits of yaw of the carriage about its center of travel. The floating, zero offset, reference point is established by passing a magnetic shield (in the form of a vane) into and then out of the gap between the reed and magnet. This causes the reed switch to open and then close, to establish the floating, zero offset, reference point for the system. Thus, at "power-up", the carriage will move in a direction which causes the vane to pass through the gap, to establish the floating, zero offset, reference point. The system then uses that floating, zero offset, reference point to control subsequent movements of the carriage.

One problem with such types of magnetic proximity sensors is that in time and under the operating conditions of the system, the location of the floating, zero offset, reference point may vary. This may be due to changes in magnet field strength, temperature, vibration and other electrical and metallurgical reasons effecting the opening and/or closure of the switch contacts. Moreover, over time dirt and contaminate built up on the elements of the magnetic proximity sensor switch and gap can affect the sensing of the floating, zero offset, reference point of the system. As the floating, zero offset, reference point of the system varies, the entire system may thus lose the degree of precision required to properly control the carriage and the load handling device on the carriage.

SUMMARY OF THE PRESENT INVENTION

The present invention provides a new and useful device for initializing an automated warehouse system, when the system is in its "power-up" mode of establishing an initial point of reference. The device of the present invention is designed to reduce types of errors or erroneous readings which may occur over periods of time with a magnetic proximity sensor, or indeed other edge sensitive techniques.

The device utilized in the present invention initializes the system at "power-up" by sensing the midpoint of a specially formed gap between two strips of retroreflective tape, and establishing the midpoint of that gap as the floating, zero offset, reference point for the system. The lengths and locations of the strips of tape and the gap are non-critical, and the technique of gap centering is relatively insensitive to the types of factors (e.g., temperature, vibration, electrical or metallurgical factors) which tend to affect edge type sensing such as the prior technique utilizing a magnetic proximity sensor. Moreover, by determining and using the midpoint of the gap as the floating, zero offset, reference point, the likelihood of erroneous readings due to dirt contamination or other materials building up or changes in photo sensor sensitivity is significantly reduced. Specifically, since the measured center of the gap, rather than the absolute width of the gap is the determining factor, the likelihood of unacceptable inaccuracies in the system is minimized, i.e., the absolute measurement of gap width may well vary over time but the measured center position will remain fixed.

The device of the present invention utilizes two strips of retroreflective tape with a gap therebetween located along a track. A photoelectric sensor connected to the moveable carriage senses the presence or absence of the tapes as the carriage moves along the track. The system has a default mode, designed to cause the sensor to sequentially sense (i) one of the tapes, (ii) the gap, and (iii) the other tape. A high speed counter accurately measures the length of the gap, and calculates (identifies) the midpoint of the gap. The midpoint then becomes the floating, zero offset, reference point for the system, and all movement of the carriage is controlled relative to the floating, zero offset, reference point. While the perceived width of this gap may change due to dirt, temperature, or drift in sensitivity, the center of the gap will remain fixed.

The system has several default modes designed such that at "power-up" the system will default to a condition in which, during the initialization cycle, the sensor sequentially (i) senses the first tape, (ii) senses and measures the gap, and (iii) senses the second tape, and (iv) locates the midpoint of the gap, regardless whether the sensor is located over either tape or over the gap at "power-up". Specifically, the system has a TAPE OFF zone adjacent the first tape. Normally, the initialization cycle includes movement of the sensor from the TAPE OFF zone onto the first tape. The default mode is set such that if the sensor is initially located over either tape or the gap at "power-up", the carriage will be initially manipulated to bring the sensor clear of both tapes and the gap and into the TAPE OFF zone. Thereafter, the default mode of the system causes the sensor to move from the TAPE OFF zone onto the first tape and to sequentially (i) sense the first tape, (ii) sense and measure the gap, (iii) sense the second tape, and (iv) locate the midpoint of the gap to initialize the system.

Further objects and features of the present invention will become further apparent from the following detailed description and the accompanying drawings.

DETAILED DESCRIPTION OF THE PREFERRED EMBODIMENT

Figure 1:
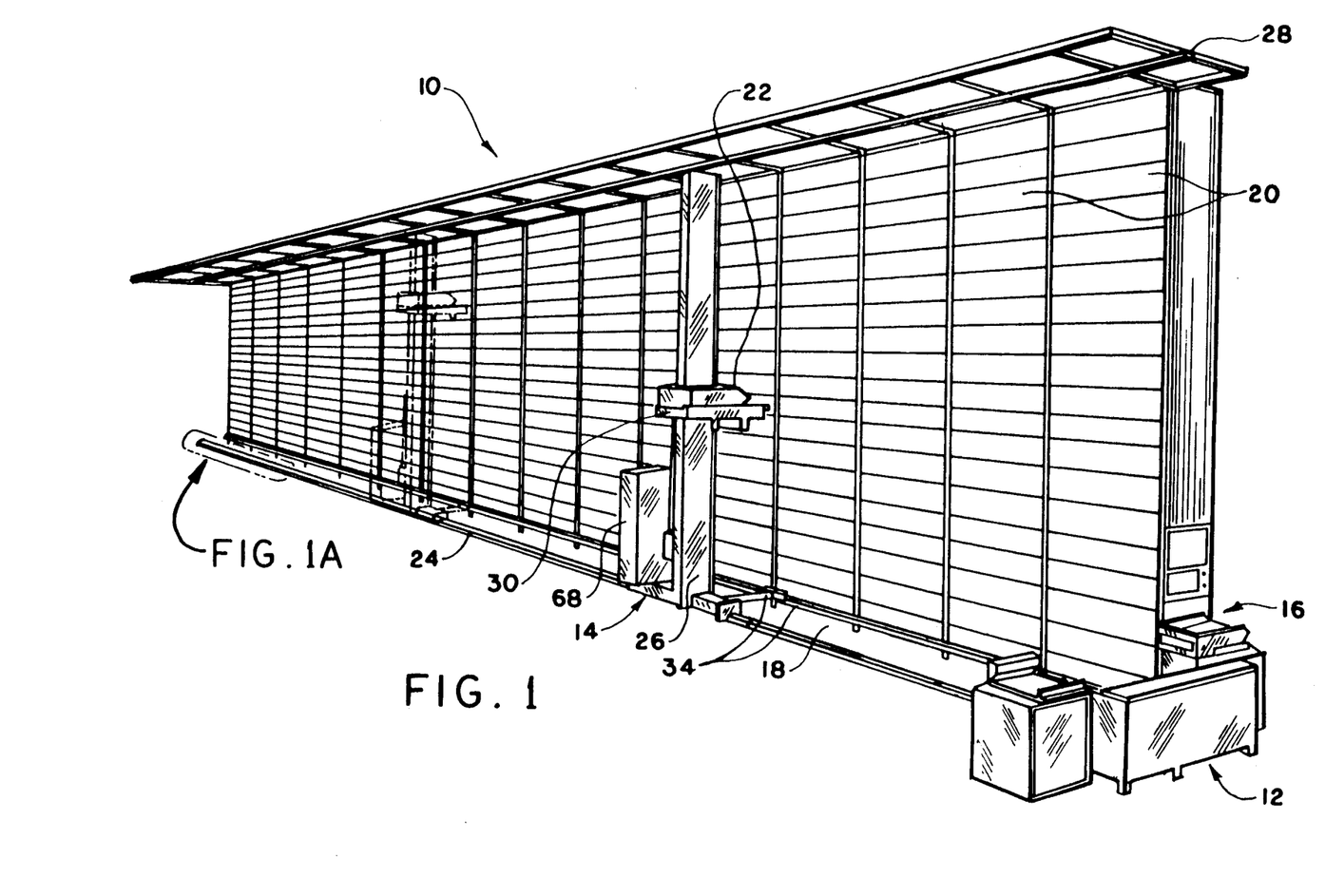
FIG. 1 is a schematic three dimensional view of an automated warehousing system according to the present invention.

FIG. 1 shows a portion of an automated warehousing system constructed according to the present invention. The automated warehousing system would be associated, for example, with a manufacturing facility (not shown) for warehousing or staging either parts or materials, or both.

The automated warehousing/staging system comprises a storage rack 10, a pick-up and delivery station 12, a moveable carriage 14, and an operator computer terminal 16 for tasking the movement of the carriage 14. The storage rack 10 is disposed on one side of an aisle 18. The storage rack 10 has horizontal rows and vertical columns of bin locations (or stations) 20. Each bin location 20 is designed to support a bin 22 which contains particular materials or parts. Each bin location 20 has a specific numerical designation which represents the horizontal and vertical coordinates of the bin location. The numerical designations of the bin locations enables the system to deliver bins 22 to, or retrieve bins from, selected bin locations in the storage rack 10. The pick-up and delivery station 12 is adapted to receive bins retrieved from the storage rack 10, or to provide bins to be delivered to selected bin locations 20 on the storage rack 10.

The carriage 14 is adapted to (i) pick up a bin 22 from the pick-up and delivery station 12 and deliver the bin 22 to a selected bin location 20 on the storage rack 10 or (ii) retrieve a bin 22 from a selected bin location 20 on the storage rack 20 and deliver the bin 22 to the pick-up and delivery station 12. The carriage 14 is remotely controlled, by means of the operator computer terminal 16, for delivering bins 22 to, or receiving bins 22 from, selected bin locations 20 on the storage rack 10 and the pick-up and delivery station 12.

The pick up and delivery station 12 provides a physical handling interface between the automated warehouse/staging system and a material transportation system (not shown). The material transportation system, which forms no part of this invention, is adapted for directing bins 22 to and from the manufacturing facility. The pick up and delivery station 12 may comprise one or more stands, or may be designed to convey, transfer, rotate, lift or tilt the bins, in ways well known to those in the art. The pick-up and delivery station 12 is typically located at one end of the aisle 18, as viewed in FIG. 1.

Carriage 14 is moveable along a floor-mounted track 24. Carriage 14 has a vertical mast assembly 26 with an upper end which is supported and guided by an overhead track 28. The tracks 24 and 28 extend the length of aisle 18. The mast assembly 26 supports a vertically traveling load handling device 30. The load handling device 30 is designed to be moved to a selected bin location 20 and to manipulate a bin 22 into or out of bin location 20, as described more fully below.

The operator computer terminal 16 is located at one end of aisle 18. The operator station 16 communicates to and tasks a computerized vehicle controller 68 which controls (i) horizontal movement of carriage 14 along the tracks 24, 28, (ii) vertical movement of the load handling device 30 along the mast assembly 26, and (iii) movement of the load handling device 30 relative to the bin locations 20. A collector and power rail system 34 delivers electrical power to the carriage 14, and delivers electrical signals from the operator computer terminal 16 to the computerized vehicle controller 68 on the carriage 14 which directs and controls movement of the carriage 14 and the load handling device 30.

The operator computer terminal 16 includes a memory and a central processing unit. The memory stores information as to the numerical designation (coordinates) of each bin location 20. The operator computer terminal 16 further tasks the computerized vehicle controller 68, (ii) which outputs instructions to the carriage 14 and the load handling device 30 to move to the selected bin location 20 and to deliver a bin 22 to, or retrieve a bin 22 from, the pick-up and delivery station 12. The computerized vehicle controller 68 receives such operator computer terminal 16 commands, processes the inputs to produce digital control signals for carrying out the operator commands, and directs the digital control signals to carriage 14. The operator computer terminal 16 further includes a diagnostics display screen (not shown) which displays all carriage 14 functions and the status of all sensors on the carriage 14 via communications over the collector and power rail system 34.

Figure 2:
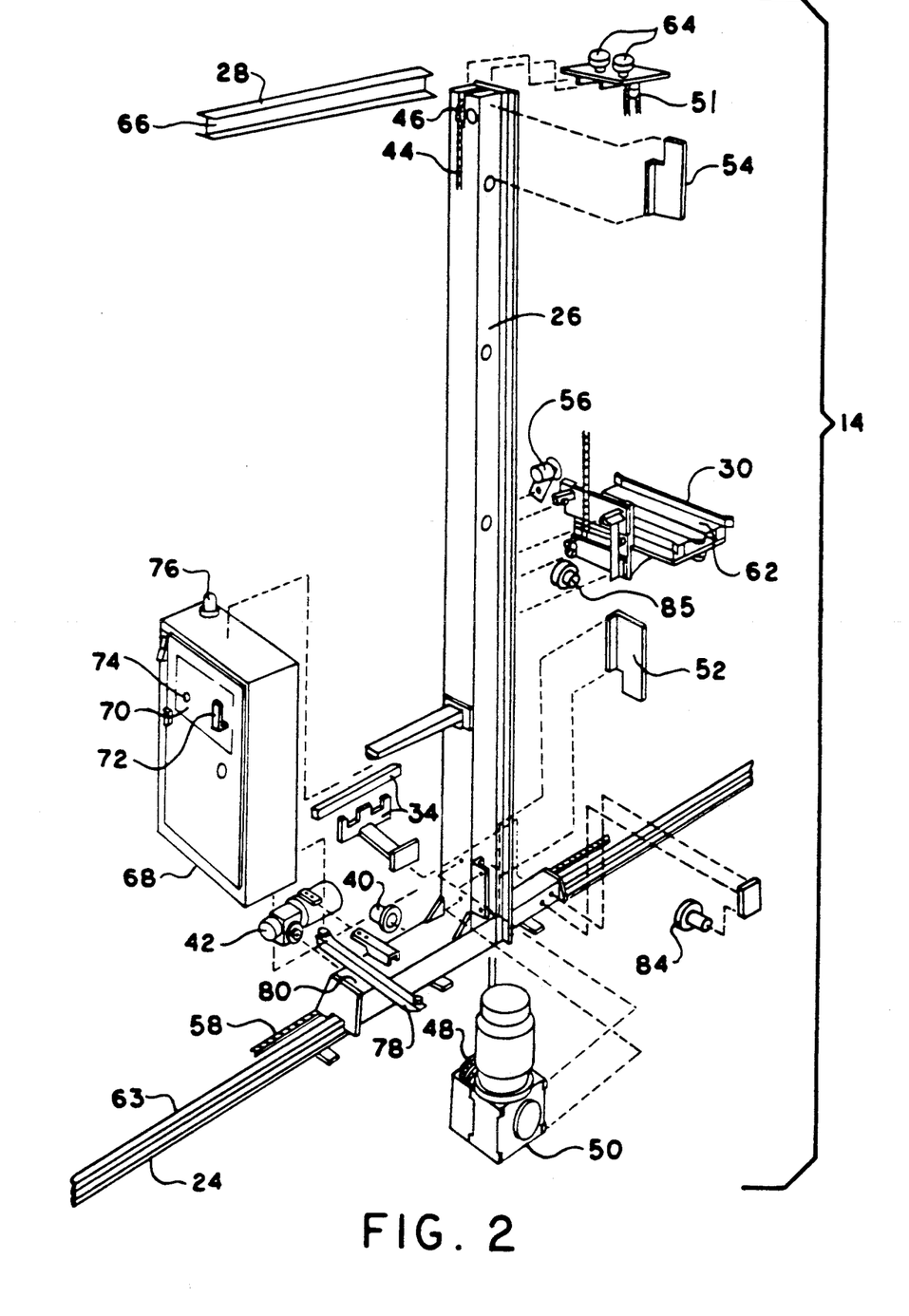
FIG. 2 is a schematic three dimensional, exploded view of components of the carriage and load handling device in an automated warehousing system according to the present invention.

As shown in FIG. 2, the computerized vehicle controller 68 is mounted on the carriage 14. The computerized vehicle controller 68 is connected with a horizontal encoder 40, a vertical encoder 56, a photoelectric sensor 84 and 85, as described below. The foregoing elements are used in initializing the system at "power-up", and in subsequent control of the system in accordance with instructions from the computerized vehicle controller 68.

The computerized vehicle controller 68 receives instructions from the operator computer terminal 16 and converts those instructions into digital movement instructions for the carriage 14 and the load handling device 30. The horizontal encoder assembly 40 produces pulsed signals to the vehicle controller 68 in timed relation to the movement of the carriage 14 along the track 24. In turn, the vehicle controller 68 generates electrical analog signals which drive the carriage 14 along the track 24, and monitors movement of the carriage 14 along the track 24 based upon the signals received from the encoder 40. Specifically, the horizontal encoder assembly 40 has a disc which is rotated by movement of the carriage 14 along the track 24. The disc interrupts a light signal at fixed intervals of rotation, and the interrupted light signals, which represent increments of movement of the carriage, are directed to the controller 68. The vehicle controller 68 generates analog signals which cause a horizontal drive assembly 42 attached to carriage 14 to drive carriage 14 along the horizontal track 24. Moreover, the vehicle controller 68 uses the pulsed signals received from the horizontal encoder assembly 40 to monitor movement of the carriage 14 along the track 24 to enable the carriage 14 to be driven to the horizontal coordinate of the bin location 20 being serviced. The signals from the horizontal encoder assembly 40 are initialized during the "power-up" mode of the system, as described more fully herein, so that the movement of the carriage 14 along track 24 accurately corresponds to instructions received from the vehicle controller 68.

The mast assembly 26 includes a vertical cable 44 which supports the load handling device 30. The cable 44 is rotatable around drum 48 and sheave 46. A vertical drive assembly 50 operates the drum 48 and sheave 46 to lift and lower the load handling device 30. The mast assembly 26 includes an overload sensor assembly 51 and a vertical switch assemblies 54 and 52 which serve to limit the range of movement of the load handling device 30 along mast assembly 26.

The mast assembly 26 further includes a vertical encoder assembly 56. The vertical encoder assembly 56 is similar to the encoder 40, and produces pulsed signals to the vehicle controller 68 in relation to defined increments of movement of the load handling device along the mast assembly 26. The controller 68, in turn, generates the electrical analog signals which move the load handling device 30 along the mast assembly 26 and monitors the position of the load handling device along the mast assembly 26. Specifically, the vertical encoder assembly 56 converts rotational movement of a disc into pulsed signals to the vehicle controller, representing increments of movement of the load handling device along the mast assembly 30. The controller generates the electrical analog signals which (i) cause the vertical drive assembly 50 to drive the load handling device 30 to the vertical coordinate of the bin location 20 being serviced and (ii) cause another drive assembly (not shown) to manipulate the load handling device 30 to retrieve a bin 22 from, or deliver a bin 22 to, the bin location 20 being serviced. Further, as the load handling device 30 is being moved along the mast assembly 26, the controller responds to the pulsed signals from the vertical encoder assembly 56 to monitor the location of the load handling device 30 along the mast assembly 26.

The horizontal drive assembly 42, the vertical drive assembly 50, and the load handling drive assembly (not shown), each comprises (i) a bi-directional, electrical motor, and (ii) output means (not shown) which connects the respective drive assembly to the carriage 14 or the load handling device 30. Such output means are well known to those in the art and should require no further explanation.

A preferred model of encoder assembly suitable for either the horizontal encoder assembly 40 or the vertical encoder assembly 56 is manufactured by B.E.I. Motion Systems Company, Industrial Enactor Division, 7230 Hollister Avenue, Goleta, Calif. 93117-2891, and sold under the model number H25D-60-ABC-7406R-LED-SM16-S. Each encoder assembly monitors the movement of the carriage 14 or the load handling platform 30 by means common in the art, e.g., the horizontal encoder assembly 40 has a disc which is rotated by a horizontal encoder chain 58; the vertical encoder assembly 56 has a disc which is rotated by a vertical encoder chain (not shown). Each of the horizontal and vertical encoder assemblies 40, 56 relay information on the position of the carriage 14 to the vehicle controller 68.

The encoder assemblies 40, 56 relay information on the position of the carriage 14 and the load handling device 30 to the vehicle controller 68, which generates electrical control signals. The control signals, both digital and analog signals, are used to (i) cause the drive assemblies (e.g., 42, 50) to move the carriage 14 and the load handling device 30 to the desired bin location 20, and to (ii) enable operation of the load handling device 30 when the load handling device 30 reaches the desired bin location 20.

The load handling device 30 can take any of several forms which are known in the art. For example, the load handling device may include a platform 62 which is moved horizontally in a cross aisle direction (by the load handling drive assembly, not shown). The platform 62 is moved toward and away from a bin location 20 in response to control signals received from the vehicle controller 68. The load handling device 30 either retrieves a bin 22 from a bin location 20 or delivers a bin 22 to a bin location 20. Moreover, the load handling device 30 is adapted to deliver a bin 22 retrieved from the storage rack 10 to the pick-up and delivery station 12, or to retrieve a bin 22 from the pick-up and delivery station 12 and to deliver the bin 22 to a selected bin location 20. Conventional gripping means (not shown) may be associated with the platform 62 and load handling device 30 to ensure that a bin 22 is securely retained on the platform 62 as the bin 22 is being delivered to, or retrieved from, a bin location 20 of the pick-up and delivery station 12 by means of the platform 62 and load handling device 30. The vehicle controller 68 continuously receives input relating to the position of the load handling device 30 and instructs the drive assemblies 42, 50 to insure proper positioning of platform 62 and operation of the load handling device 30 with respect to a selected bin location 20. The movements of the carriage 14 and the load handling device 30 in respect to the vertical and horizontal coordinates of the bin location 20 being serviced can be sequential or simultaneous, as will be readily recognized by those of ordinary skill in the art.

The overhead track 28 and the floor-mounted track 24, each have a substantially I-beam design. Floor-mounted track 24 is anchored to the floor along the center of aisle 18, while overhead track 28 is attached to cross aisle ties (not shown), which further serve as structural braces between rows of bins. The horizontal drive assembly 42 has a driven wheel (not shown) which rides along the top, flat portion 63 of the track 24. The mast assembly 26 has a pair of guide rollers 64 which ride along the opposite sides of an intermediate wall portion 66 of the overhead track 28.

During normal operation of the system, an operator inputs into the operator terminal 16 information as to the operation to be carried out (e.g., delivery or retrieval of a bin 22) and the bin location 20 involved in the operation. The operator terminal 16 tasks the vehicle controller 68 which, in combination with the encoders 40, 56, processes that information and controls the drive assemblies 42, 50 to cause the carriage 14 and the load handling device 30 to carry out the operation.

Although the vehicle controller 68 automatically controls the operation of carriage 14, it is sometimes necessary to manually operate the carriage 14. The vehicle controller 68 has a manual control panel 70 thereon. The manual control panel 70 enables movement of the carriage 14 and load handling device 30 to be manually carried out. The control panel 70 is coupled to the various drive assemblies (by means conventional in this art) and is adapted to selectively control the drive assemblies to enable the carriage 14 and the load handling device 30 to be manually controlled. Such manual control is necessary, for example, in the event of a failure in the hardware associated with the vehicle controller and/or operator terminal 16. The vehicle controller 68 includes a carriage power disconnect 72, an emergency stop button 74, and a flashing beacon 76 which further aid in preventing injury and harm to personnel during automated or manual operation of the system. The vehicle controller cabinet 68 is mounted on vibration isolation pads 78 along a base frame 80 of the carriage 14.

When the system is initially "powered-up", the horizontal encoder 40 must be "initialized", i.e., it must identify a floating, zero offset, reference point from which movements of the carriage 14 can be controlled by the vehicle controller 68 as directed by the operator computer terminal 16. The floating, zero offset, reference point is established by the structure and in the manner described below, according to the principles of the invention.

Specifically, at one or more selected positions along the floor-mounted track 24 and the mast 26, two pieces of retroreflective tape B and D, are located horizontally along the intermediate wall 82 of the track 24 (see particularly FIG. 1A) and vertically along the mast 26. The two strips of tape have a gap C therebetween. It has been determined that the system performs optimally if strip B and the gap C have a length of approximately one inch, and if the second strip D has a length of approximately sixty inches. Tape B has a "leading edge" 71 and a "trailing edge" 73 adjacent the gap C (see FIG. 1A). Tape D has a "leading edge" 75 adjacent gap C and a "trailing edge" 77 adjacent the end of track 24. The "trailing edge" 77 of tape D is beyond the "end of travel" position for the carriage 14 along the track 24.

Figure 1A:
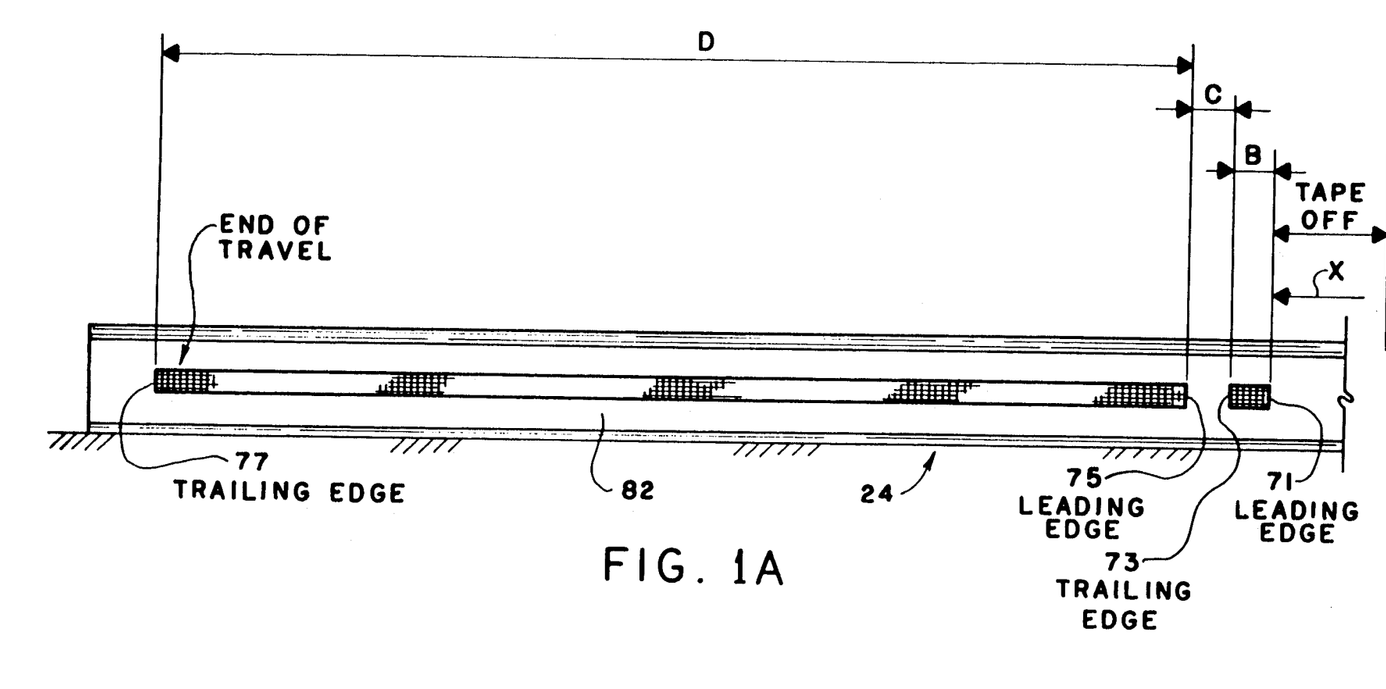
FIG. 1A is an enlarged view of the portion 1A of the floor-mounted track in the system of FIG. 1, showing the gap and the two strips of retroreflective tape.

According to the principles of the present invention, at "power-up", the system immediately locates the midpoint of the gap C, in the manner described below. The midpoint of the gap C then becomes the floating, zero offset, reference point which is assigned to the particular signal from encoder 40 which corresponds to that reference point, and against which subsequent movement of the carriage 14 is controlled.

The sensor 84, consisting of a photoelectric element, is mounted on the carriage 14. As the carriage 14 moves along the track 24, the sensor 84 scans the intermediate wall 82 of the track, and identifies the presence or absence of the strips of retroreflective tape B, D, and the presence or absence of gap C therebetween. Preferably, the sensor 84 is located to scan the intermediate wall 82 of the track 24 at an angle of 90° relative to the intermediate wall 82. Information from the sensor 84 is communicated to the vehicle controller 68. The vehicle controller 68 processes the information received from the sensor 84, and uses the information to (i) initialize the signals from the encoder 40 at "power-up" and as a consequence, (ii) identify the "end of travel" positions for the carriage 14 during normal operation, as described hereinafter.

Figure 3A:
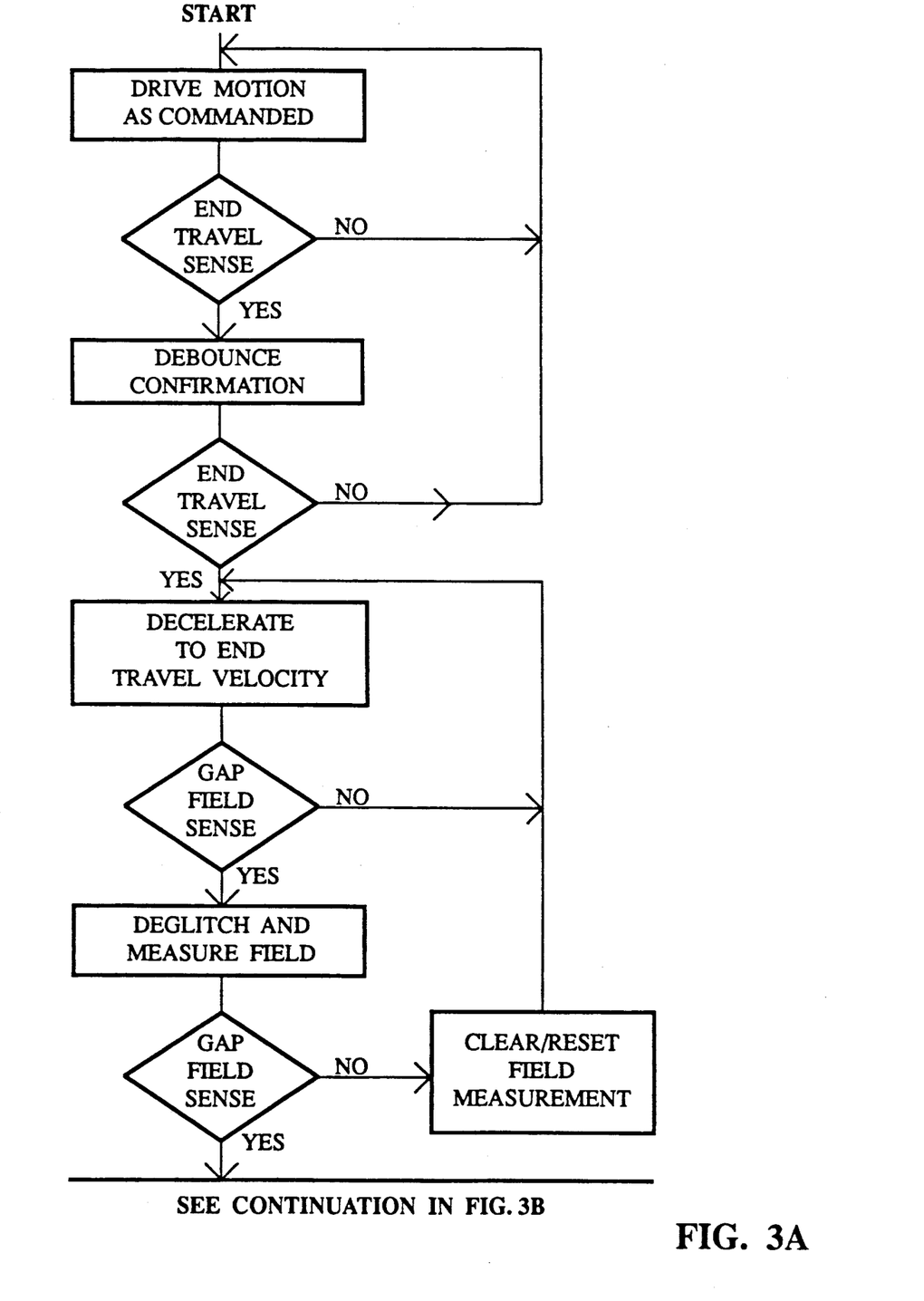
FIGS. 3A and 3B schematically illustrate a flowchart of the technique used to initialize the automated warehousing system at "power-up", according to the principles of the present invention.
Figure 3B:
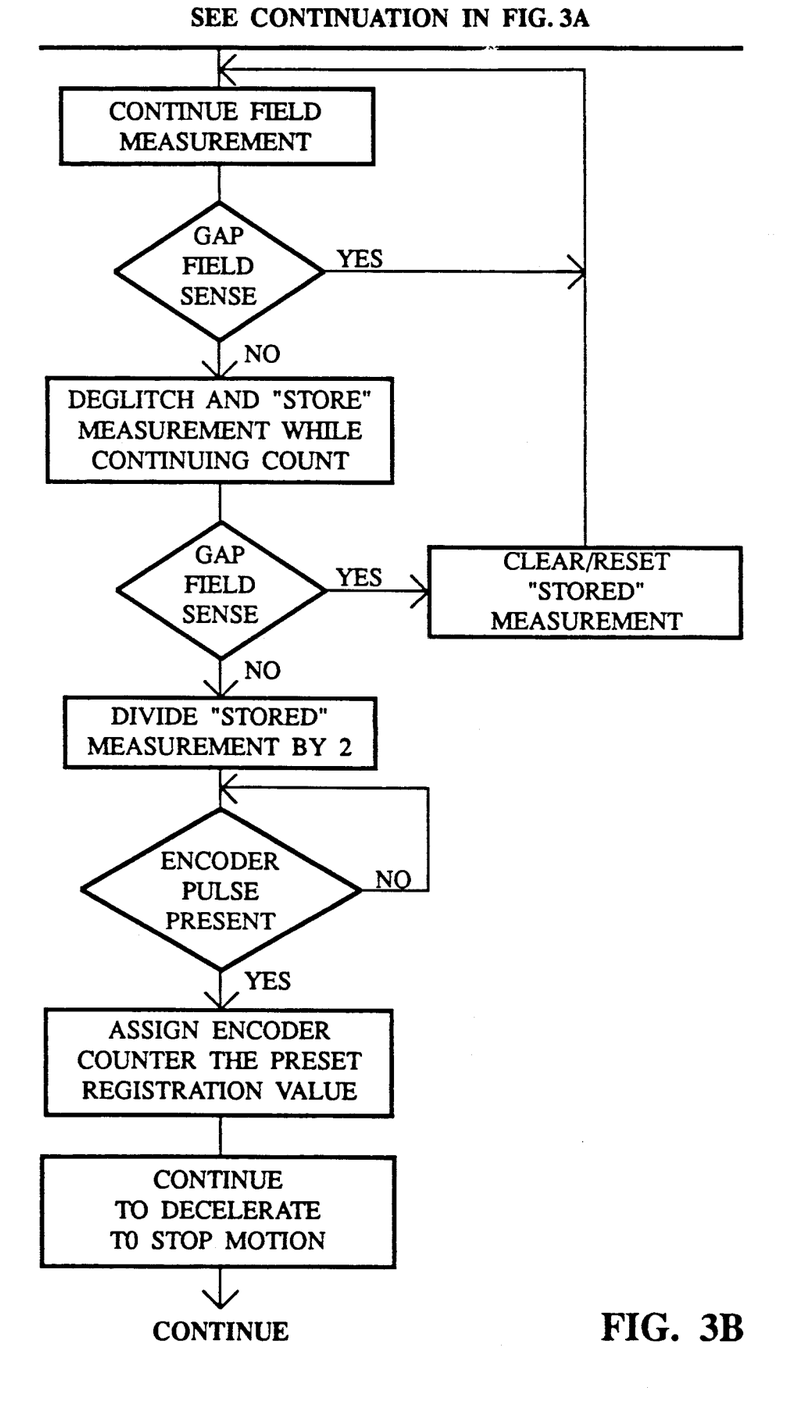

FIGS. 3A and 3B schematically illustrate the steps used to initialize the signals received from encoder 40 at "power-up", according to the principles of the present invention. The system has several default modes at "power up". The default modes of the system result in the carriage 14 beginning the initialization cycle by moving from a TAPE OFF zone adjacent tape B onto the tape B in the direction shown by the arrow X in FIG. 1A. The sensor 84 is armed to identify the leading edge 71 of strip B. Upon identifying the leading edge 71 of the strip B, the system does a DEBOUNCE CONFIRMATION to confirm that the sensor 84 has, in fact, identified the strip B. If the sensor 84 still identifies the strip B, the vehicle controller 68 controls the drive assembly 42 to begin to DECELERATE the carriage 14, and arms the sensor 84 for identifying the trailing edge 73 of the tape B.

If sensor 84 identifies the trailing edge 73 of the retroreflective tape B within approximately one inch, the system will enter the GAP FIELD SENSE mode. In that mode, the vehicle controller 68 will monitor operation of the encoder 40 to MEASURE the gap C. When the sensor 84 senses the leading edge 75 of the second reflective strip D, the vehicle controller 68 stores the value of the gap measurement C, which the vehicle controller 68 then divides by two, and assigns the signals received from the encoder 40 a floating zero offset, reference value corresponding to that (center of gap) measurement. The vehicle controller 68 commands the carriage 14 to continue decelerating to a complete stop. The value of the measurement relating to the midpoint of gap C becomes the system floating, zero offset, reference point against which all subsequent movement of the carriage 14 is referenced. The vehicle controller 68 ASSIGNS the signals received from encoder 40 the floating, zero offset, reference point corresponding to the midpoint of gap C, and then allows the carriage 14 to CONTINUE decelerate to a stop motion condition at some measured distance relative to the floating, zero offset, reference point (within the length of tape D). The system is then initialized.

When a movement command is given by the operator terminal 16, the vehicle controller 68 will generate control signals to cause the carriage 14 to carry out that command relative to the floating, zero offset, reference point. The vehicle controller 68 can carry out the instructions from the operator terminal 16 in a conventional manner, using the floating, zero offset, reference point to control movement of the carriage 14 relative to the horizontal coordinate of the selected bin location 20.

Further, with such a floating, zero offset, reference point, the control means on the carriage 14 is also able to locate an "end of travel position" for the carriage 14 as the carriage 14 is moving along the track 24. Specifically, as the carriage 14 is moving toward the end of the track 24, the sensor 84 identifies, sequentially, the tape B, the gap C and the tape D. A fixed numeric position relative to the established floating zero-offset reference point and within the length of tape D identifies the "end of travel" position for the carriage 14. During normal operation, when the sensor 84 identifies tape B, the vehicle controller commands the carriage 14 to begin to slow down, and causes the carriage 14 to be fully stopped prior to the carriage 14 reaching the trailing edge 77 of the tape D. Thus, during normal operation, the tapes B and D enable the system to determine the "end of travel" position for the carriage 14 and to stop the carriage by the time the carriage reaches the "end of travel" position.

At "power-up", when the system is being initialized, the sensor 84 carried by the carriage 14 may be in any of several locations along the track 24. It may be located on one of the tapes B or D, it may be located on the gap C, or it may be spaced a distance from the tapes B, D and the gap C. The default mode of the system is designed to enable the system to be properly initialized, regardless of the location of the carriage 14 and the sensor 84 at "power-up", as discussed below.

Figure 4A:
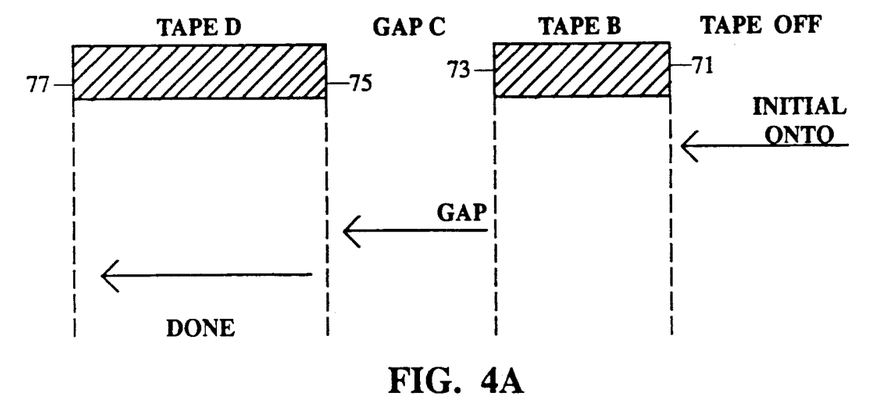
FIG. 4A is a schematic illustration of the default mode of the system when the carriage is located a distance from the pair of retroreflective tapes at "power-up"
Figure 4B:
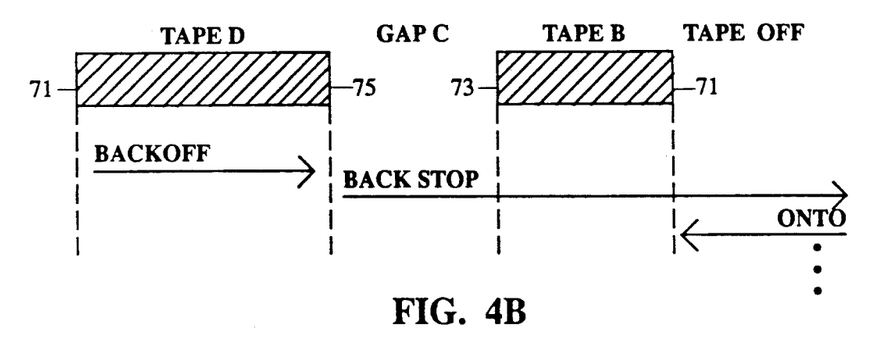
FIG. 4B is a schematic illustration of the default mode of the system when the carriage is located on either one of the pair of tapes at "power-up"
Figure 4C:
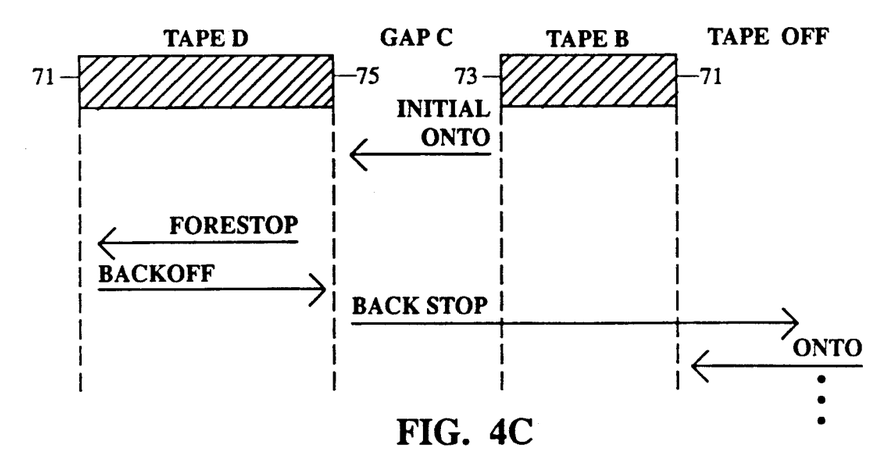
FIG. 4C is a schematic illustration of the default mode of the system when the carriage is located in the gap at "power-up".

FIGS. 4A-4C schematically illustrate the default mode of the system in each of the foregoing circumstances. Specifically, FIG. 4A schematically illustrates the default mode of the system at "power-up", when the carriage 14 is spaced a distance from the tapes B, D and the gap C. The ONTO default mode of the system causes the carriage 14 to move in a first direction, from the TAPE OFF zone adjacent tape B, and in the INITIAL ONTO direction, toward the tapes B, D. As it moves in the first direction along the track 24, the carriage 14 will move the sensor sequentially ONTO the tape B, the gap C and the tape D. The initialization of the system then proceeds in the manner described above. When the carriage 14 and the sensor 84 complete the DONE stage, the carriage 14 will be stopped at the "end of travel" and the initialization cycle will be complete.

FIG. 4B schematically illustrates the default mode of the system when the sensor 84 is located on either the first tape B, or second tape D at "power-up". During "power-up", if the sensor 84 is initially located on a tape strip (e.g., tape strip D), the vehicle controller 68 will command the carriage 4 to travel in BACKOFF mode, wherein the carriage 14 will travel in a direction opposite to the ONTO direction, until the sensor 84 identifies the leading edge 75 or 71 of either tape D or B, respectively. Upon identifying the leading edge of either tape, the vehicle controller 68 enters the BACKSTOP mode and will command the carriage 14 to begin to decelerate and will cause the carriage 14 to continue at a distance approximately two inches inches beyond the leading edge of the identified tape. Because gap C and tape B are approximately each one inch long, that distance will insure that regardless of which tape B, D the sensor 84 has identified, the carriage 14 will move in the BACKSTOP mode a sufficient distance to clear tape B and move into the TAPE OFF zone. The vehicle controller 68 will then cause the system to shift to the ONTO default mode, to move the carriage in the first direction (e.g., FIG. 4A). The initialization process will then take place in the manner described above, and schematically illustrated in FIG. 4A.

FIG. 4C schematically illustrates the default mode of the system, when the sensor 84 is located in the gap C during "power-up". The system will initially enter the ONTO default mode, and carriage 14 will move in the first ONTO direction. The sensor 84 will then sense the leading edge 75 of tape D. Since the system is initially armed into its ONTO default mode, the vehicle controller 68 anticipates sensing the trailing edge 73 of the first tape after about one inch of travel, i.e., the length of tape B. When the trailing edge 73 of tape D is not identified within a predetermined distance beyond one inch, the vehicle controller will enter the FORESTOP state and will command carriage 14 to decelerate and stop. The system will then switch to the BACKOFF mode and the carriage 14 will move in the reverse direction, in the manner described with respect to FIG. 4B, until it clears the tape B and moves into the TAPE OFF zone. The system will then switch to the ONTO default mode, and will follow the above mentioned initialization process as in the embodiment of FIG. 4A.

Once the system is initialized, in the manner described above, instructions from the vehicle controller concerning movement of carriage 14 are carried out and are referenced in relation to the midpoint of gap C. During a normal "power-off" sequence, the position of both gap C and the position of the vehicle are retained in the vehicle controller 68 memory for automatic power recovery. However, it is possible that when power to the system is interrupted, the location of gap C can be lost from memory. The carriage 14 may be at any location depending upon the last operation it performed before the interruption. Consequently, the system must be reinitialized at a subsequent "power-up" to locate the midpoint of gap C, and to reference movement of the carriage 14 relative thereto.

It is to be understood that while a certain form of the present invention has been illustrated which shows one carriage moveable along a single storage rack, it is not to be limited to these specific forms or arrangement of parts herein described and shown. For instance, a warehousing/staging system might employ a carriage which carries out operations along an aisle with storage racks on both sides of the aisle. Also, the warehousing/staging system could employ a plurality of carriages moveable along the tracks, and each carriage might be initialized at "power-up". Also, the principles of this invention could be used to initialize vertical movement of the load handling device 30 along mast 26. In other words, the system of the present invention might be employed in a more elaborate and complicated system than what is illustrated, without deviating from the scope of this invention.

The foregoing features of an automated warehousing/staging system are known to those in the art, and should require no further explanation. The manner in which the warehousing/staging system is initialized during "power-up", according to the principles of the present invention, is described below.

What is claimed is

1. An automated warehouse/staging system comprising a series of stations, a track extending along at least a portion of the stations, and a carriage moveable along said track for registration with the portion of said stations;

said system having a power-up mode when power is initially delivered to the system;

initializing means operative during said powerup mode for establishing a reference point against which movement of said carriage along said track is controlled, said initializing means comprising a pair of strips of retroreflective material located in series along said track with a gap located therebetween, and means for (a) sensing both the leading and trailing edges of the gap, (b) measuring the gap, (c) locating the midpoint of the gap, (d) establishing the midpoint as the reference point against which movement of the carriage along the track is controlled.

2. An automated warehouse/staging system as defined in claim 1, wherein said initializing means comprises sensing means for sensing the presence of said strips of retroreflective material as said carriage moves along said track, said sensing means being adapted to sequentially sense (i) a first one of said pair of strips, (ii) the leading and trailing edges of said gap, and (iii) the second of said pair of strips as said carriage moves in a first direction along said track.

3. An automated warehouse/staging system as set forth in claim 2, wherein said system has a default mode at power-up, the default mode being adapted at power-up to cause the carriage to move in said first direction along said track.

4. An automated warehouse/staging system as defined in claim 3, wherein said system includes a TAPE OFF zone adjacent to said first strip, said default mode being adapted to cause the carriage and the sensing means to move from the TAPE OFF zone in said first direction to cause said initializing means to establish said reference point.

5. An automated warehouse/staging system as defined in claim 4, wherein said default mode is adapted when the sensing means is located on either of said pair of strips or on the gap at power-up to cause the carriage and the sensing means to move to the TAPE OFF zone and then in the first direction to enable said initialization means to establish said reference point.

6. An automated warehouse/staging system as defined in any of claims 2-5, wherein said sensing means is adapted to sense the leading and trailing edges of each of said pair of strips, said initializing means being adapted to cause the carriage to begin to slow when said sensing means senses the leading edge of said first strip and to cause the carriage to stop prior to the time the sensing means senses the trailing edge of said second strip.

7. An automated warehouse/staging system as defined in claim 6, wherein said first one of said pair of strips has a length of about one inch, said gap has a length of about one inch, and said second of said pair of strips has a length of about 60 inches.

8. An automated warehouse/staging system as defined in claim 7, wherein said stations include horizontally spaced columns of bin locations, each column having a plurality of vertically spaced bin locations, said track extending horizontally along said columns of bin locations.

* * * * *